Oct. 15, 1968     B. A. WALLACE ET AL     3,405,691
ZONED FURNACE

Filed Aug. 26, 1966     3 Sheets-Sheet 1

INVENTORS
Bruce A. Wallace
Martin O. Fankhanel
Walter Leitner

John C. Quinlan
Don H. Phillips
ATTORNEYS

Oct. 15, 1968  B. A. WALLACE ET AL  3,405,691
ZONED FURNACE
Filed Aug. 26, 1966  3 Sheets-Sheet 3

INVENTORS
*Bruce A. Wallace*
*Martin O. Fonkhanel*
*Walter Leitner*

*John C. Quinlan*
*Dan H. Phillips*
ATTORNEYS 3,405,691
ZONED FURNACE
Bruce A. Wallace, White Plains, and Martin O. Fankhanel, Cambria Heights, N.Y., and Walter Leitner, Penns Neck, N.J., assignors to Pullman Incorporated, Chicago, Ill., a corporation of Delaware
Filed Aug. 26, 1966, Ser. No. 575,422
8 Claims. (Cl. 122—240)

ABSTRACT OF THE DISCLOSURE

The present invention relates to a zoned furnace particularly adapted to heat fluids, especially hydrocarbons, to temperatures at which chemical reactions of the fluid will occur, such as, for example, the pyrolysis of hydrocarbons to yield ethylene and other products. The invention includes a furnace provided with a series of thermally isolated, independently fired radiant heating zones, and multiple passes of process fluid tubing, each pass of which is passed in sequence through the series of zones. Each pass of tubing is geometrically situated in relation to the heat sources in a manner identical to that of every other pass, thereby insuring thermal equivalence between the multiple passes in a common heating zone. The zones of the furnace are isolated to provide completely independent heating of the several zones and to eliminate significant heat transfer between the zones.

---

Figure 1:
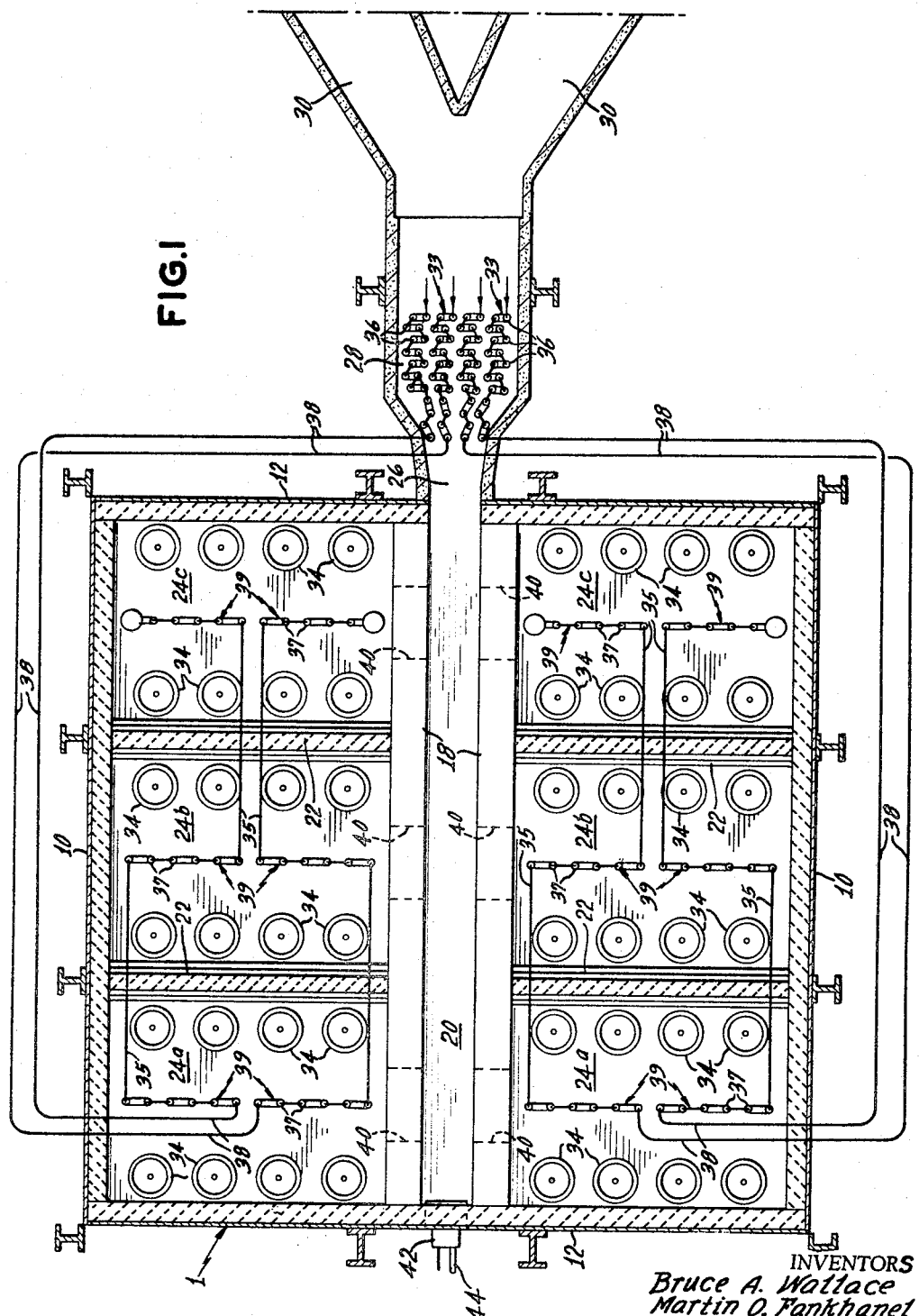

The present invention relates to apparatus for the fired heating of fluids and more particularly to improvements in the design of furnaces for heating fluids to high temperatures such as, for example, furnaces for thermal or catalytic reforming, or pyrolysis of light hydrocarbons. In "severe," i.e., high temperature, low residence time pyrolysis operations it is necessary to subject the process fluid to carefully controlled uniform high temperatures for precise periods of time, often measured in fractions of a second, in order that the high heat influx to the process fluid being treated may be controlled so as to have the desired reactions occur, and to avoid or minimize undesirable side reactions. This objective is generally sought to be accomplished by present furnace designs.

Furnaces are conventionally designed so that a structural frame work supports an enclosed furnace chamber. Tubes through which the process fluid to be treated is passed are arranged in a series of tube passes passing through the enclosed furnace chamber. Fuel burners are positioned within the furnace chamber in a fired or radiant heating section of the furnace to burn liquid or gaseous fuel, the combustion of which serves as the source of heat imparted to the process fluid. Those portions of the process fluid tube passes in which it is desired to have the pyrolytic or thermal reaction take place, hereinafter referred to as the reaction tubes, are generally exposed in the fired section of the furnace to the burner flames and combustion gases, so that primarily radiant heating of the reaction tube surfaces takes place in the fired, i.e., radiant heating section of the furnace, although the flow of combustion gases also provides some convection heating.

Preheating of the process fluid prior to its introduction into the reaction tubes is carried out in an initial portion of the tube pass, hereinafter referred to as the preheat tubes, by passing combustion gases exhausted from the radiant heating section of the furnace into a convection heating chamber which contains the preheat tubes. The preheat tubes within the convection heating chamber are not normally shielded, except by one another, from the radiant heat sources in the radiant heating section of the furnace.

High temperature, short residence time pyrolysis operations require that the process fluid be brought quickly to high reaction temperatures. Process fluid outlet temperatures may be of the order of about 1500° F. to about 1650° F. Combustion gas temperatures of up to about 2400° F. are required to attain these temperatures. In order to preheat the process fluids in the convection heating section to close to the desired reaction temperatures, flue gas temperatures of up to about 2300° F. are advantageously utilized in the convection heating chamber. It is essential for efficient operation of the furnace that the convection preheating be uniform and closely controlled. Excessive heating of the fluid in the preheat tubes will result in undesired premature reactions taking place, whereas insufficient preheating will result in failure to attain the desired degree of reaction.

Uniform heating of the process fluid in the reaction tubes is likewise essential. Localized overheating in the reaction tubes can cause undesirable side reactions as well as degrade the process fluid and cause excessive coke and tar formation within the tubes. Excessive coke formation within the reaction tubes creates "hot spots" on the tube surface by slowing up heat transfer to the reacting process fluid and may result in thermal failure of the tubes.

The problem of attaining uniform heating of the reaction tubes, i.e., within the radiant heating section of the furnace, is compounded when, as is the usual case, furnace capacity is increased by providing a plurality of individual tube passes to course independent streams of process fluid through the furnace. The individual tube passes passing through a common radiant heating section tend to shield each other from the source of radiant heat to a greater or lesser extent depending on the geometry of the tube passes in relation to the sources of radiant heat. Not only does the shielding effect cause uneven heating of a given reaction tube, but it may result in unequal heat input as between different tube passes with resulting loss of precise control and uniformity of the heat input per unit of time to the different streams of process fluid. The heat input per unit time, or the "time temperature profile," has a pronounced effect on product yield and by-product mix. Consequently, the efficiency of the pyrolysis process is greatly affected by variations in heat input along different portions of the tube pass. In attempting to attain effective control of the pyrolysis reaction, present furnace designs may utilize intermediate barriers within the radiant heating section of the furnace so that a series of interconnected firing compartments or zones is formed within the radiant heating section of the furnace, each zone being supplied with its own independently controlled fuel burners. The shielding effect of parallel tube passes is avoided by providing a separate firing zone or zones with its own independent sources of radiant heat for each pass of process fluid tubing. Thus, a multi-pass pyrolysis furnace designed in accordance with the prior art may contain two or more passes of process tubing, each of which is arranged within a separate zone or zones of a series of firing zones within the furnace enclosure.

Unfortunately, present furnace designs are unsatisfactory in several respects. One major disadvantage of present design is the difficulty, usually due to heat transfer between the firing zones, of maintaining precisely the desired temperatures and temperature differentials between the zones through which the process fluid is passed. This heat transfer is particularly unfortunate in view of the criticality of the temperature levels imposed on the process fluid at various points within the furnace in determining the product yield and by-product mix of the pyrolysis process.

Another disadvantage of present furnace design resides in the necessity of providing a separate firing zone or separate series of firing zones for each pass of tubing in order to insure uniform radiant heating of the entire surface of the process tubing contained within the firing zones, i.e., the reaction tubes. Providing separate firing zones for each pass of tubing is necessarily a less efficient and less economical design than one which utilizes two or more passes of process fluid tubing in common firing zones.

Yet another disadvantage of present furnace designs resides in the fact that the heat available to the convection heating section is limited by the firing rates employed in the firing zones and the design temperature limitations of the convection heating section.

It is therefore the object of the present invention to overcome these and other shortcomings by providing a furnace of improved design.

More specifically, it is an object of the present invention to provide an improved furnace design which provides individual firing zones completely isolated from each other wherein temperatures within a given zone and temperature differentials between zones may be precisely maintained.

Another object of the invention is to provide a furnace design wherein each tube pass of a plurality of tube passes can be equally and uniformly heated over its entire surface within a common firing zone.

Yet another object of the invention is to provide a furnace design in which convection preheating of the process fluid may be controlled independently of the firing rates employed in the firing zones and maintained at higher temperatures than those attainable by utilizing only the heat available by convection from the firing zones.

Other objects and advantages of the invention will be apparent from the following description and accompanying drawings which, taken together, disclose a novel and efficient combination of features incorporated into a furnace of improved design.

A furnace designed in accordance with the invention consists essentially of an enclosed setting within which at least one series of firing zones is formed by a series of refractory walls which attain essentially the full height of the enclosed setting. The firing zones thus formed are entirely isolated from each other. A common flue zone is formed within the setting in flow communication with each of the isolated firing zones. The flue zone in turn is connected in flow communication to a convection heating chamber.

Within the convection heating chamber a series of interconnected preheat tubes through which the process fluid is passed are supported in a suitable manner and disposed so as to be heated by flue gases passing through the convection heating chamber.

Within each firing zone a plurality of fuel burners mounted in any suitable manner are positioned adjacent to each of two oppositely disposed refractory walls so that the flames and hot combustion gases generated by the fuel burners pass over the refractory walls and constitute a radiant heating surface. A series of vertical process fluid reaction tubes are positioned in single row alignment midway between and parallel to the two oppositely disposed refractory walls adjacent the plurality of fuel burners. The vertical reaction tubes are supported by appropriate means and spaced sufficiently from each other so that they will all be evenly radiantly heated by the burner flames and combustion gases.

Suitable interconnecting means connect at least a pair of the vertical tubes in each of the firing zones of a series of firing zones and at least one of the tubes in the convection heating chamber to form at least one pass of process tubing which passes the process fluid through the convection heating chamber and through each firing zone of a series.

Additional fuel burners may optionally be provided in the common flue zone to further heat the flue gases prior to their being passed over the preheat tubes disposed in the convection heating chamber.

Figure 2:
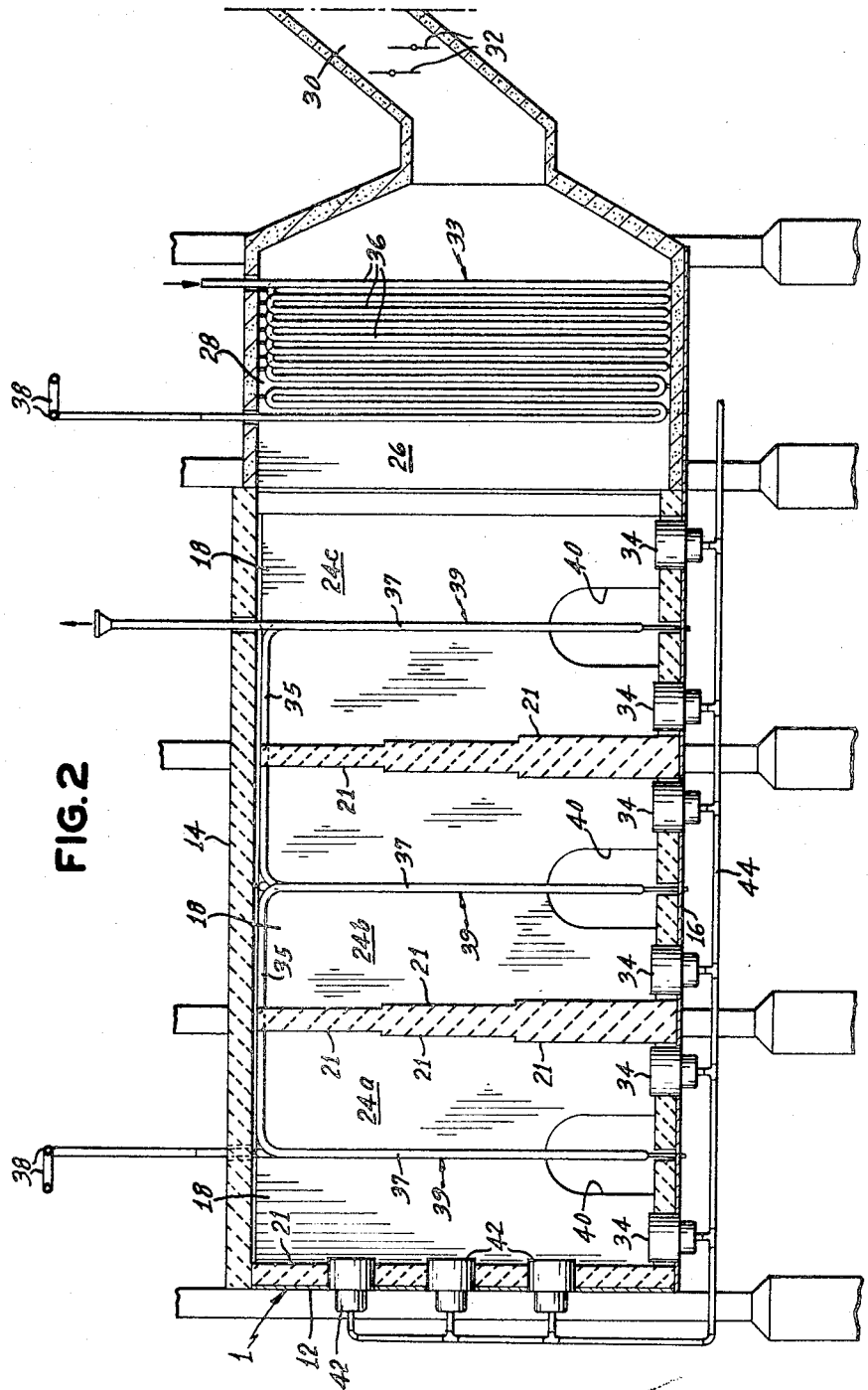
Figure 3:
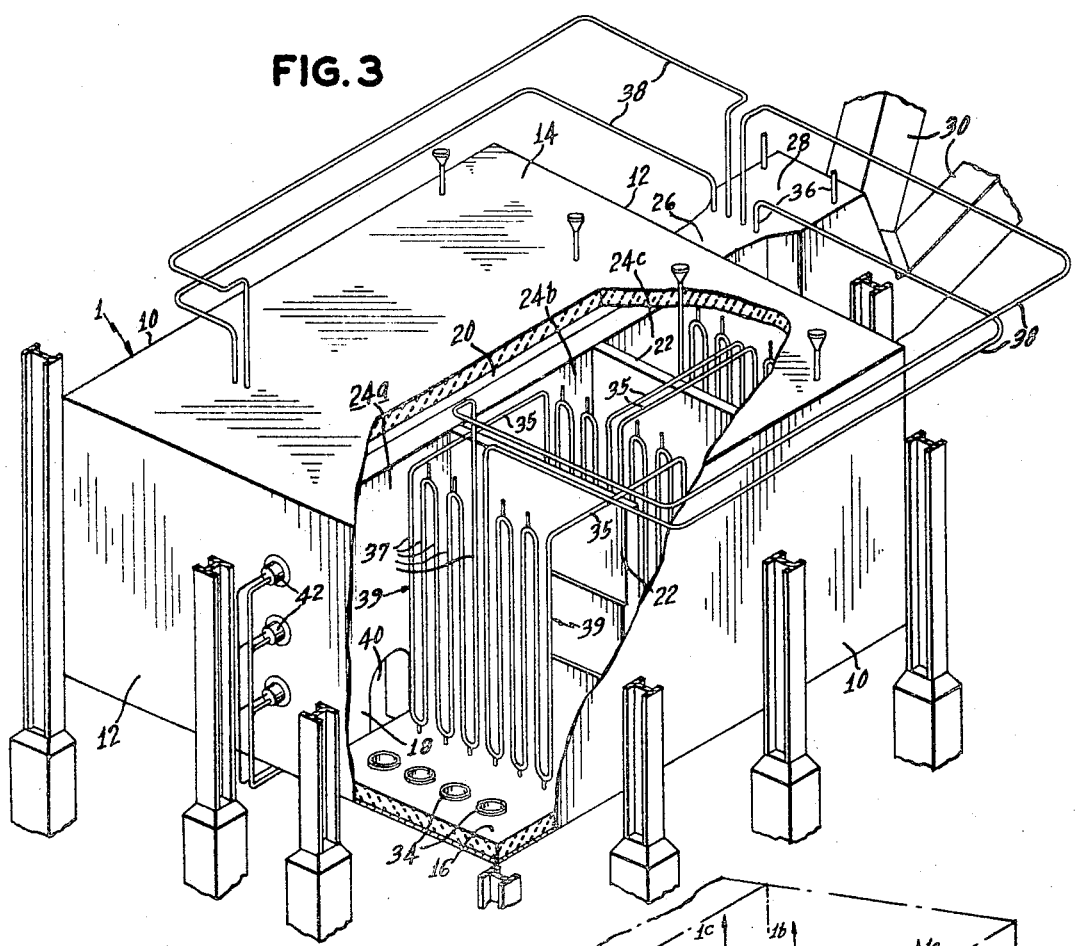
Figure 4:
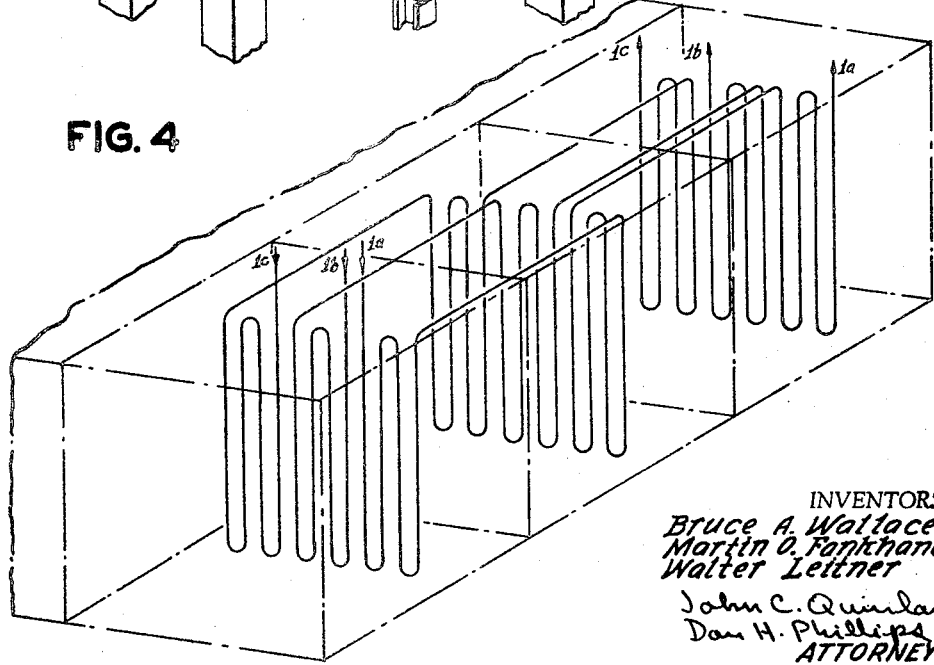

Reference is now made to the drawings, of which FIGURE 1 is a sectional plan view of a preferred embodiment of the invention. FIGURE 2 is a sectional view in elevation of the furnace of FIGURE 1. FIGURE 3 is an isometric view in partial section of the furnace of FIGURE 1. FIGURE 4 is a schematic representation of an arrangement of process tubing different from that utilized in the preferred embodiment of the invention illustrated in FIGURES 1, 2 and 3.

As shown in the drawings of FIGURES 1, 2 and 3, an essentially rectangular enclosed setting 1 is formed by side walls 10, end walls 12, roof 14 and floor 16. Longitudinal walls 18 positioned within the enclosed setting attain essentially the full height of the interior of enclosed setting 1, only enough space being left between the top of longitudinal walls 18 and the roof 14 to allow for thermal expansion of the walls. Longitudinal walls 18 are spaced from and parallel to each other to form a common flue zone 20 coextensive with enclosed setting 1. A series of bridge walls 22 are disposed within enclosed setting 1 parallel to end walls 12 and abutting longitudinal walls 18 at right angles to form two series of firing zones 24a, 24b and 24c. Like longitudinal walls 18, bridge walls 22 attain essentially the full height of interior setting 1 so that firing zones 24a, 24b and 24c are each isolated one from another. That is, there is no direct flow communication of combustion gases between firing zones but each firing zone is in flow communication only with the common flue zone. The isolated cellular construction of the firing zones and the thermal insulating property of the refractory material of construction prevents virtually any heat transfer between firing zones and, consequently, temperatures in one firing zone may be precisely controlled independently of temperatures in adjacent firing zones.

Each firing zone is provided with ventilation means 40 located in longitudinal walls 18 thus providing combustion gas flow communication between each firing zone and common flue zone 20. Flue gas exit 26 permits passage of the flue gas (formed in common flue zone 20 by admixture of the combustion gases withdrawn from each firing zone) to convection heating chamber 28. Flue zone 20, flue gas exit 26, and convection heating chamber 28 are in series flow communication with exhaust duct 30. Damper means 32 are provided within both branches of bifurcated exhaust duct 30 to control the passage of flue gas passing therethrough.

A plurality of floor mounted burners 34 are positioned within each of the firing zones. The burners are arranged within each firing zone in two rows of single row alignment with each row positioned parallel to and spaced from an adjacent upright refractory wall provided, in the case of firing compartments 24a and 24c, by end walls 12 and bridge walls 22 and, in the case of center firing zones 24b, by bridge walls 22. It is thus seen that each firing zone consists of an essentially rectangular setting isolated completely from every other firing zone and providing two refractory upright surfaces 21 parallel to and oppositely disposed one another. Burners 34 are supplied with fuel and air for combustion through a suitable piping arrangement 44. The rate of firing of each of the burners is independently controlled by means well known in the art. The burners are positioned so that each burner in a set directs its flame and combustion gases upwardly along the adjacent upright refractory surface 21 to heat and envelop refractory wall surfaces 21 with flame and hot combustion gases so that a radiant heating surface is formed.

Process fluid is passed through the furnace by means of four independent tube passes, two of the passes passing through each of the two series of isolated firing zones. Each tube pass consists of the following:

Vertical preheat tubes 36 disposed within convection heating chamber 28 and interconnected to form preheat tube coils 33.

Vertical reaction tubes 37, disposed within firing zones 24a, 24b and 24c and interconnected to form reaction tube coils 39.

Internal crossover tubing 35 connecting reaction tube coils 39 in series flow.

External crossover tubing 38 connecting preheat tube coils 33 in series flow with reaction tube coils 39.

Process fluid enters preheat tube coils 33 in convection heating chamber 28 and then passes via external crossover tubing 38 to reaction tube coil 39 in firing zone 24a, thence serially via internal crossover tubing 35 to reaction tube coils 39 in firing zones 24b and 24c. Reaction tube coils 39 are positoned within their respective firing compartments so that vertical reaction tubes 37 are in single row alignment parallel to and midway between oppositely disposed fired refractory surfaces 21. Vertical reaction tubes 37 are sufficiently spaced from each other to prevent adjacent tubes from shielding one another from the radiant heat emanating from the radiant heating surfaces formed on refractory surfaces 21. In this manner each tube of each pass of process tubing is completely and uniformly exposed over its entire surface to the sources of radiant heat. Two passes of process tubing are thus arranged within a common series of firing compartments with a total of four passes in the furnace.

It is apparent that any number of tube passes may be utilized within a firing compartment limited only by practical considerations of the size of the firing compartments and the number of passes desired. For example, as shown in FIGURE 4 of the drawings, three parallel passes of process tubing 1a, 1b and 1c, may be arranged within a single firing compartment so that each pass is symmetrically and equally exposed to the heat influx imposed by the radiant heating surfaces formed on refractory surfaces 21. It is equally apparent that any desired number of vertical tubes may be interconnected to form a single tube coil disposed within a firing zone, and that any number of firing zones may be provided in a series of firing zones and utilized in combination with any number of independent tube passes. It is thus apparent that the process fluid tubing design and arrangement of the present invention provides great flexibility and a wide range of design choices to meet any process requirements, and that each design choice provides completely uniform and equal heat input to the process fluid in each of the parallel tube passes.

Referring again to FIGURES 1, 2 and 3, during operation of the furnace spent combustion gases from each of the firing compartments pass through ventiliation means 40 in longitudinal walls 18 into common flue zone 20. Ventilation means 40 are placed at or near the floor level of the furnace in order to promote circulatory flow of the combustion gases within the firing zones and thus obtain improved heat transfer by forcing the rising hot combustion gases emanating from the burner flames to descend in combining flow to the bottom of the firing zone before passing through ventilation means 40 into common flue zone 20. Upon entering flue zone 20 the combustion gases emerging at floor level from each of the firing zones combine in rising flow and pass as flue gas from flue zone 20 via flue gas exit 26 into convection heating chamber 28. Vertical preheat tubes 36 are heated by the hot flue gases as they pass through convection heating chamber 28. Thereafter, the flue gases are removed from the furnace via exhaust duct 30 wherein their passage is controlled by dampers 32.

A set of wall mounted burners 42, supplied with fuel and air by a suitable piping arrangement 44, are fired in flue zone 20 to additionally heat the combustion gases exhausted from firing compartments 24a, 24b and 24c and maintain these gases at a temperature higher than that attainable by utilizing only the convection heat carried over from the several firing zones. The temperature of the exhaust gases introduced into convection heating chamber 28 may therefore be maintained at a high level independent of the firing rates employed within the several firing zones. Since the firing zones of a series may be, and usually are, maintained at different temperatures, the interposition of the relatively long common flue zone 20, in combination with the floor level location of ventilation means 40 permits adequate mixing of the combustion gases exhausted from the various firing zones and preferably additionally heated in flue zone 20, so that a flue gas of uniformly high temperature is provided to the convection heating chamber. The process fluid may thus be uniformly preheated close to the desired high reaction temperature prior to entering the firing zones and may be quickly brought to reaction temperature upon entering the reaction tube coils in the firing zone of the furnace.

The vertical disposition of preheat tubes 36 promotes uniform heating of each pass of preheat tubes inasmuch as the preheat coils constituting each pass are placed parallel to the direction of flow of the hot flue gases and each pass of preheat tubing is thus similarly situated with respect to the temperature gradient existing across the convection heating chamber. The vertical arrangement of the preheat tubes also eliminates the need for intermediate tube supports which would be required to support equivalent horizontal preheat tubes, many of which would have to be located within the hottest portions of the convection section in order to adequately support horizontal tubes. Since high temperature pyrolysis operation often requires flue gas temperatures on the order of about 2300° F. in order to adequately preheat the process fluid, tube supports located in the hot portions of the convection section would have to be constructed of expensive, high temperature heat resistant alloys. In contrast, the vertical preheat tube construction utilized permits supporting the preheat tubes from the top of the convection section, similar to the manner in which the reaction tubes are supported in the radiant heating section of the furnace, thus eliminating the need for a large quantity of expensive, high temperature heat resistant intermediate tube supports. The vertical preheat tube construction also minimizes tube sag and in general simplifies construction of the preheat tube section.

Many useful and necessary items and details of construction, such as peep doors, access doors, expansion joints, valves, etc. have been omitted from the drawings and description for the sake of simplicity.

It will be apparent to those skilled in the art that many changes can be made in the design and construction of the furnace described or of similar furnaces, without departing from the scope of the present invention.

What is claimed is:

1. A furnace comprising an enclosed setting,
   at least one series of isolated firing zones formed within said setting by a series of refractory walls attaining essentially the full height of said setting,
   a common flue zone formed within said setting and in flow communication with each of said isolated firing zones,
   a convection heating chamber in flow communication with said common flue zone,
   a series of preheat tubes disposed within said convection heating chamber,
   a plurality of fuel burners positioned within each of said firing zones adjacent respectively to oppositely disposed said refractory walls so as to pass flames and hot combustion gases generated by said burners over said oppositely disposed refractory walls,
   a series of vertical tubes disposed within each of said firing zones in single row alignment midway between and parallel to said oppositely disposed refractory walls, each of said tubes being spaced a sufficient distance from each adjacent tube to permit substantially even radiant heating of the entire tube surfaces by said flames and hot combustion gases, means for interconnecting vertical tubes within a firing zone to form within each firing zone at least two reaction tube coils, each of said coils containing at least two of said vertical tubes interconnected in series flow communication, and means for interconnecting in series flow communication one reaction tube coil from each firing zone of a series of firing zones and at least one of said preheat tubes to form one pass of process fluid tubing, each of said at least two reaction tube coils being thus interconnected to form at least two corresponding passes of process fluid tubing with each of said passes of tubing passing through said convection heating chamber and each firing zone of a series.

2. A furnace in accordance with claim 1 having two series of firing zones within said setting, one on either side of said common flue zone.

3. A furnace in accordance with claim 2 having fuel burners positioned within said common flue zone to heat flue gases passing therethrough.

4. A furnace in accordance with claim 2 having said preheat tubes vertically disposed within said convection heating chamber.

5. A furnace comprising an enclosed setting,
at least one series of isolated firing zones formed within said setting by a series of refractory walls attaining essentially the full height of said setting,
a common flue zone formed within said setting and in flow communication with each of said isolated firing zones,
a convection heating chamber in flow communication with said common flue zone,
a series of preheat tubes disposed within said convection heating chamber,
a plurality of floor mounted fuel burners positioned within each of said firing zones adjacent respectively to two oppositely disposed said refractory walls so as to pass flames and hot combustion gases generated by said burners over said oppositely disposed refractory walls,
floor level ventilation means providing sole flow communication between each of said firing zones and said common flue zone,
a series of vertical tubes disposed within each of said firing zones in single row alignment midway between and parallel to said oppositely disposed refractory walls, each of said tubes being spaced a sufficient distance from each adjacent tube to permit substantially even radiant heating of the entire tube surfaces by said flames and hot combustion gases, and
means for interconnecting in series flow communication at least a pair of said vertical tubes in each firing zone of a series and at least one of said preheat tubes in said convection heating chamber to form at least one pass of process fluid tubing passing through said convection heating chamber and each firing zone of a series.

6. A furnace comprising an enclosed setting,
a common flue zone formed by two parallel interior walls within said setting, said walls attaining essentially the full height of said setting,
two series of isolated firing zones formed within said setting on either side of said common flue zone by a series of refractory walls attaining essentially the full height of said setting,
floor level ventilation means in each of said firing zones providing sole flow communication between each of said firing zones and said common flue zone,
a convection heating chamber in flow communication with said common flue zone,
a series of preheat tubes disposed within said convection heating chamber,
a plurality of floor mounted fuel burners positioned within each of said firing zones in two rows of single row alignment, each of said rows adjacent respectively to oppositely disposed said refractory walls so as to pass flames and hot combustion gases upwardly over the adjacent said oppositely disposed refractory walls,
a series of vertical tubes disposed within each of said firing zones in single row alignment midway between and parallel to said oppositely disposed refractory walls, each of said tubes being spaced a sufficient distance from each adjacent tube to permit substantially even radiant heating of the entire tube surfaces by said flames and hot combustion gases, and
means for interconnecting in series flow communication at least a pair of said vertical tubes in each firing zone of a series and at least one of said preheat tubes in said convection heating chamber to form at least one pass of process fluid tubing passing through said convection heating chamber and each firing zone of a series.

7. A furnace in accordance with claim 6 having said preheat tubes vertically disposed within said convection heating chamber.

8. A furnace in accordance with claim 6 having fuel burners within said common flue zone to heat flue gases passing therethrough.

References Cited

UNITED STATES PATENTS

| 2,335,317 | 11/1943 | Sherman | 122—356 |
| 2,613,654 | 10/1952 | Becker | 122—356 XR |
| 3,182,638 | 5/1965 | Lee et al. | 122—240 |
| 3,274,978 | 9/1966 | Palchik et al. | 122—356 |

KENNETH W. SPRAGUE, *Primary Examiner.*